US006984958B2

(12) United States Patent
Niiranen

(10) Patent No.: US 6,984,958 B2
(45) Date of Patent: Jan. 10, 2006

(54) METHOD FOR DEFINING QUADRATURE-AXIS MAGNETIZING INDUCTANCE OF SYNCHRONOUS MACHINE

(75) Inventor: Jouko Niiranen, Helsinki (FI)

(73) Assignee: ABB OY, Helsinki (FI)

(*) Notice: Subject to any disclaimer, the term of this patent is extended or adjusted under 35 U.S.C. 154(b) by 4 days.

(21) Appl. No.: 10/502,023

(22) PCT Filed: Dec. 2, 2003

(86) PCT No.: PCT/FI03/00921

§ 371 (c)(1),
(2), (4) Date: Jul. 21, 2004

(87) PCT Pub. No.: WO2004/051840

PCT Pub. Date: Jun. 17, 2004

(65) Prior Publication Data

US 2005/0017669 A1 Jan. 27, 2005

(30) Foreign Application Priority Data

Dec. 3, 2002 (FI) .................................. 20022131

(51) Int. Cl.
H02P 5/28 (2006.01)

(52) U.S. Cl. .................. 318/716; 318/700; 318/721; 318/719; 318/801; 318/799

(58) Field of Classification Search ................ 318/700, 318/716, 721, 719, 801, 799
See application file for complete search history.

(56) References Cited

U.S. PATENT DOCUMENTS

| | | | | | |
|---|---|---|---|---|---|
| 5,144,564 | A | * | 9/1992 | Naidu et al. | ................. 318/721 |
| 5,272,429 | A | * | 12/1993 | Lipo et al. | ................... 318/808 |
| 5,510,689 | A | * | 4/1996 | Lipo et al. | ................... 318/809 |
| 5,565,752 | A | * | 10/1996 | Jansen et al. | ................ 318/807 |
| 5,608,300 | A | * | 3/1997 | Kawabata et al. | .......... 318/721 |
| 5,689,169 | A | | 11/1997 | Kerkman et al. | ............ 318/807 |
| 5,965,995 | A | | 10/1999 | Seibel et al. | ................. 318/805 |

* cited by examiner

*Primary Examiner*—Rita Leykin
(74) *Attorney, Agent, or Firm*—Dykema Gossett PLLC

(57) ABSTRACT

Method for defining quadrature-axis magnetizing inductance of a synchronous machine, the synchronous machine being supplied by an inverter. The method comprises steps, wherein the synchronous machine is started without load or with reduced load; the rotor current of the synchronous machine is kept substantially at zero, the synchronous machine is accelerated to initial angular velocity of measurement, the load angle ($d_s$) of the synchronous machine is guided substantially to 90 degrees, the stator voltage ($u_s$), the stator current ($i_s$) and the electrical angular velocity (?) of the synchronous machine is defined and the quadrature-axis magnetizing inductance of the synchronous machine ($l_{mq}$) is defined on the basis of the stator voltage ($u_s$), the stator current ($i_s$) and the electrical angular velocity (?) of the machine.

9 Claims, 2 Drawing Sheets

METHOD FOR DEFINING QUADRATURE-AXIS MAGNETIZING INDUCTANCE OF SYNCHRONOUS MACHINE

BACKGROUND OF THE INVENTION

The invention relates to defining quadrature-axis magnetizing inductance of a synchronous machine as described in the preamble of claim 1.

Synchronous machines are generally used as motors in applications that require high power and torque. Typical applications are for instance rolling drives in metal industry, in which the power of one synchronous motor can be several megawatts. A rolling drive also needs to be precise and fast to ensure the quality of the final product.

Today, frequency converters are typically used to precisely and quickly control synchronous motors. The motor is controlled with a frequency converter in such a manner that the converter part of the frequency converter produces a desired voltage or current to the motor poles. The most common frequency converter type is a frequency converter with a DC voltage link, in which the output voltages are generated from the direct voltage of the intermediate circuit with an inverter.

By using a frequency converter, it is possible to control a machine quickly and appropriately. So as to make controlling the machine possible during load situations and their changes, an as precise electric model as possible should be drafted of the synchronous machine, and on the basis of the model, the electric state of the machine can be calculated to control the machine. An electric model requires not only a mathematical description of the machine but also information on the machine parameters. These parameters, such as different types of inductances and resistances may be of different size even in similar machines of one manufacturer. The manufacturer of the machine typically declares the parameters required for the machine, but the measured values declared by the manufacturer are often inexact or deficient.

A problem arises especially in defining the magnitude of the quadrature-axis magnetizing inductance of a synchronous machine. Up till now, this has been done by using a load machine, the size of which corresponds to the size of the machine to be measured. Another known alternative is to lock the shaft reliably into place. This problem is especially emphasized in very high power categories, since the prior-art arrangement for defining quadrature-axis magnetizing inductance is significantly large and expensive.

BRIEF DESCRIPTION OF THE INVENTION

It is thus an object of the invention to develop a method that avoids the above-mentioned drawbacks and enables the definition of the magnitude of the quadrature-axis magnetizing inductance of a synchronous machine with a simpler method than before and by using an apparatus that is simpler than before. This object is achieved by a method of the invention that is characterized by what is stated in the characterizing part of the independent claim. Preferred embodiments of the invention are set forth in the dependent claims.

The invention is based on the idea that by controlling a synchronous machine into a specific state with an inverter, the magnitude of the quadrature-axis magnetizing inductance of the synchronous machine can be defined in a reliable manner.

The method of the invention provides the advantage that the measuring arrangement becomes considerably simpler, faster and cheaper than the earlier known methods.

BRIEF DESCRIPTION OF THE FIGURES

The invention will now be described in greater detail by means of preferred embodiments and with reference to the attached drawings, in which.

DETAILED DESCRIPTION OF THE INVENTION

Synchronous machines are often controlled by using vector control. In this control method, rotating vectors with a magnitude and direction are formed of the alternating current quantities prevailing in the machine. By means of vector control, the electric quantities of the controlled machine can be controlled exactly. This is based on an electric model made of the machine, which calculates the quantities prevailing in the machine. With these quantities estimated from the model and possibly measured, the machine can be controlled in an as optimal manner as possible.

Figure 1:
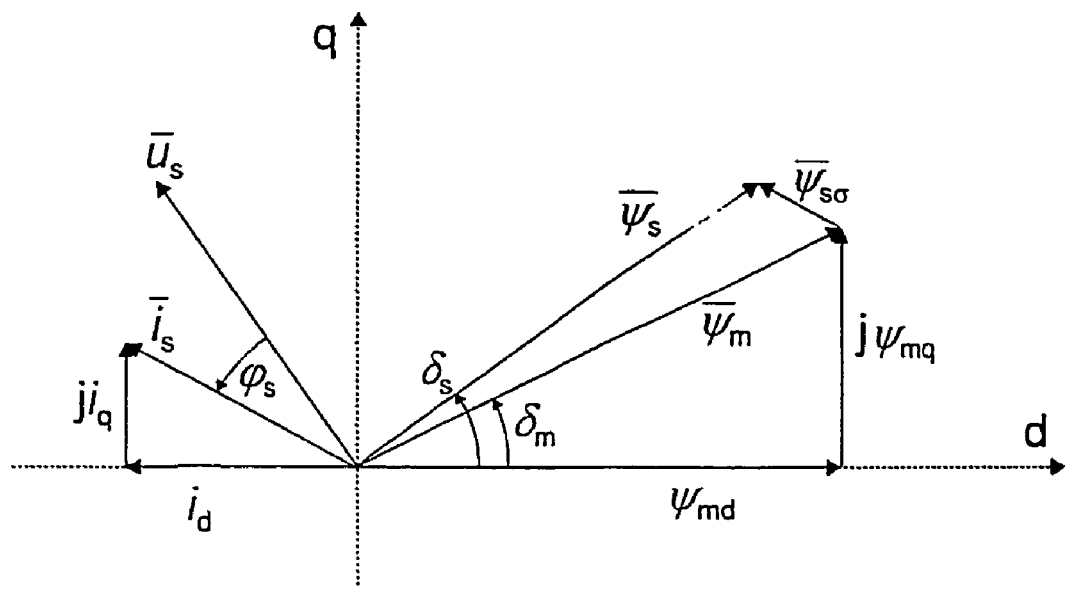
FIG. 1 is a vector diagram of a synchronous machine.

FIG. 1 shows a vector diagram of a synchronous machine, which tries to clarify the fluxes, voltages and currents prevailing in the synchronous machine during normal use. The vectors are shown in a rectangular dq coordinate system, in which the d axis is attached to the direct axis, i.e. d axis, of the rotor. Because the coordinate system is attached to the rotor, the vectors remain in place when the machine is in a steady state. FIG. 1 shows a stator flux linkage vector $\overline{\psi}_s$, air-gap flux linkage vector $\overline{\psi}_m$, stator coil leakage flux linkage vector $\overline{\psi}_{s\sigma}$, stator voltage vector $\overline{u}_s$, and field pole current vector $\overline{i}_f$ reduced to the stator. All these quantities are, as known, available during the control of a synchronous machine, when vector control or another control method based thereon is used as the control method.

In the following description of the invention, reference is made to calculations and quantities that are used in the above-mentioned dq coordinate system attached to the rotor. However, it is clear that the calculations and quantities can also be presented in other coordinate systems without in any way affecting the operation of the method of the invention.

During the method of the invention, the current in the rotor coil, i.e. field pole, is nearly zero. To achieve this, the coil is preferably shorted out. The coil current is also made nearly zero by opening the coil ends, by equipping the coil with a resistor, or by feeding it from a separate current supply. The coupling of the rotor coil for measurement can be done not only by a mechanical coupling change, but also by controlling the feeding bridge or by operating the overvoltage protection of the coil.

The method of the invention begins by starting the synchronous machine preferably with a reduced flux. The synchronous machine then operates as a reluctance machine, since the rotor is not magnetized while the field pole current is substantially zero.

According to the invention, the rotor of the machine is allowed to rotate freely, in other words, the rotor axle should not have much load. If the torque of the apparatus run by the machine cannot be decreased during measurement, it should be detached from the machine shaft.

To prevent the machine from falling from synchronism during start-up acceleration, it is often necessary to limit the load angle, i.e. stator flux angle, of the machine with respect to the direct axis, i.e. d axis, of the machine. If this load angle is to be limited to the value of $\delta_{s,max}$, the torque reference should be limited to the value of $$T_{ref,max} = \frac{3p}{2} \frac{\psi_{s,ref}}{L_{s\sigma}} [\psi_{md} \sin(\delta_{s,max}) - \psi_{mq} \cos(\delta_{s,max})], \quad (1)$$

wherein
p is the pole pair number of the machine,
$\psi_{s,ref}$ is the reference value of the stator flux,
$L_{s\sigma}$ is the leakage inductance of the stator,
$\psi_{md}$ is the direct-axis component of the air-gap flux linkage, and
$\psi_{mq}$ is the quadrature-axis component of the air-gap flux linkage. The air-gap flux linkage components can either be measured or estimated from the machine voltages and currents by using known methods. Either a value provided by the manufacturer of the motor or a measured value can be used as the leakage inductance $L_{s\sigma}$ of the stator. Direct limiting of the torque is naturally possible only with a feeding inverter, in which the control of torque is possible. This type of implementation enabling torque control is for instance described in publication U.S. Pat. No. 4,678,248.

Instead of the above torque reference, the load angle can also be limited by limiting the torque current reference perpendicular to the stator flux to a value according to formula $$i_{sTs\,ref,max} = \frac{\psi_{md} \sin(\delta_{s,max}) - \psi_{mq} \cos(\delta_{s,max})}{L_{s\sigma}}. \quad (2)$$

Naturally, it is possible to develop the formulas further and to obtain a desired load angle limitation by limiting other quantities on the basis of the used inverter type and its properties.

By using a 45-degree limitation in the motor acceleration, formula (1) becomes $$T_{ref,max} = \frac{3\sqrt{2}}{4} \frac{p}{L_{s\sigma}} \psi_{s,ref} [\psi_{md} - \psi_{mq}], \quad (3)$$

and correspondingly, formula (2) becomes $$i_{sTs\,ref,max} = \frac{\sqrt{2}}{2} \frac{\psi_{md} - \psi_{mq}}{L_{s\sigma}}. \quad (4)$$

In the start-up step, the control system of the synchronous motor uses an estimate obtained from the manufacturer of the motor on the unsaturated quadrature-axis magnetizing inductance of the motor.

After the machine accelerates to a speed sufficient for measurement, which is for instance approximately 30 to 60% of the field-weakening rate, the load angle limit of the machine is raised to 90 degrees. It should be noted that the above change in the machine rotor, such as its shorting out to prevent rotor current, can also be made after the machine has started, but before beginning the actual measurements. Formula (1) with the load angle limit at 90 degrees produces $$T_{ref,max} = \frac{3p}{2} \frac{\psi_{s,ref}}{L_{s\sigma}} \psi_{md}. \quad (5)$$

Formula (2) produces correspondingly $$i_{sTs\,ref,max} = \frac{\psi_{md}}{L_{s\sigma}}. \quad (6)$$

According to a preferred embodiment of the method, the machine speed is increased at the same time. Thus, the object of the invention is to increase the load angle of the machine to the 90-degree limit and to remain at the limit during the entire measurement.

The measurement according to the invention is begun when the currents of the damper coils and field pole are dampened. The torque produced by the machine is then also zero, and the speed of the machine does not change significantly during the measurement.

Figure 2:
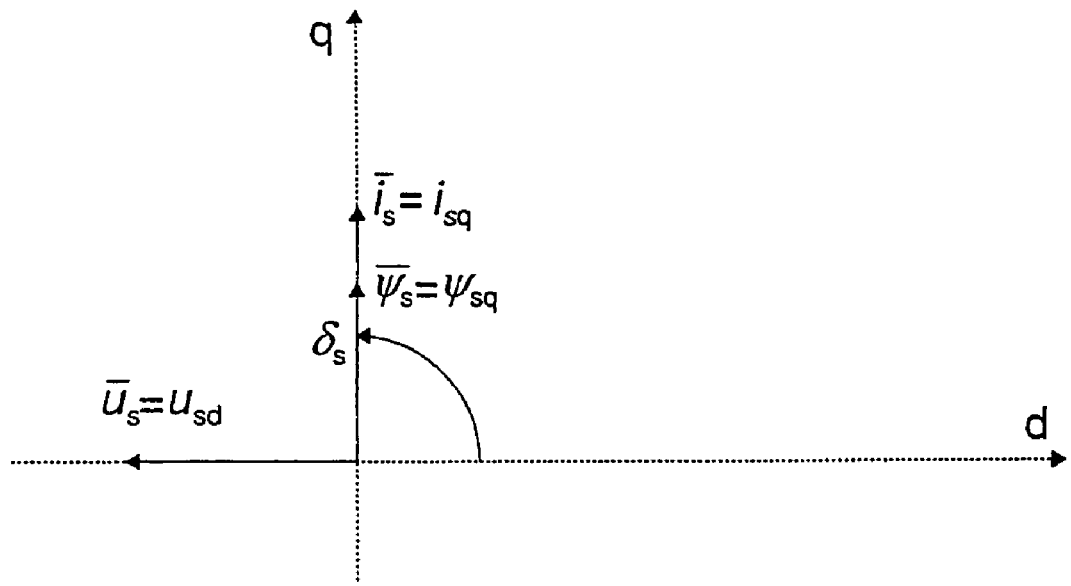
FIG. 2 is a vector diagram of a synchronous machine in connection with the method of the invention.

The stator voltage and current of the motor is defined according to the invention. The definition is made preferably by measurement, and sensors of the voltage converter controlling the motor are preferably used in this. Because the motor operates at a 90-degree load angle and the rotor currents are at zero, its stator current vector $\bar{i}_s$ is parallel to the quadrature axis, i.e. q axis, and its stator voltage vector $\bar{u}_s$ is parallel to the negative direct axis, i.e. d axis. The vector diagram of FIG. 2 illustrates the position of these vectors when using a 90-degree load angle. The quadrature-axis magnetizing inductance $L_{mq}$ is then obtained by formula $$L_{mq} = -\frac{u_{sd}}{\omega i_{sq}} - L_{s\sigma}, \quad (7)$$

wherein
$u_{sd}$ is the direct-axis component of the stator voltage,
$\omega$ is the electric angular velocity of the motor,
$i_{sq}$ is the quadrature-axis component of the stator current, and
$L_{s\sigma}$ is the leakage inductance of the stator.

According to the invention, the motor flux is preferably changed step by step and the measuring is repeated after each step after the transient has dampened. By repeating the measurements, the values of different fluxes generate a table, in which the quadrature-axis magnetizing inductance is presented as a function of the quadrature-axis current. When measuring for the table, it is advantageous to use in the control model of the machine either the last calculated inductance value or a value generated from the last measurement value by a suitable function. The motor flux can be changed in an arbitrary order, but the simplest way of changing the flux is done by increasing the flux.

The table generated with the method of the invention and a table of direct-axis magnetizing inductance defined with a normal open-circuit test can be used to empirically extrapolate the behaviour of inductances when current is running in the machine both in the direct-axis and quadrature-axis direction.

Alternatively, the stepwise flux change described above can also be replaced by a slowly changing flux reference. Formula (7) should then also take into consideration the voltage terms caused by the changes in flux and inductance.

Instead of formula (7), the inductance values can also be defined indirectly. The voltage value is then calculated by means of the initial value of quadrature-axis magnetizing inductance with formula $$u_{sd} = -\omega i_{sq}(L_{mq} + L_{s\sigma}). \quad (8)$$

The calculated voltage in the formula is compared for instance with a voltage measured with a PI controller. The output of the controller then corrects the estimate of quadrature-axis magnetizing inductance in such a manner that the error in the estimated voltage with respect to the measured decreases.

When the desired measurements have been made according to the invention, the load angle limit is returned to 45 degrees, for instance, and the motor is decelerated to a standstill. To achieve normal operation, the coupling of the rotor should yet be returned to normal.

Figure 3:
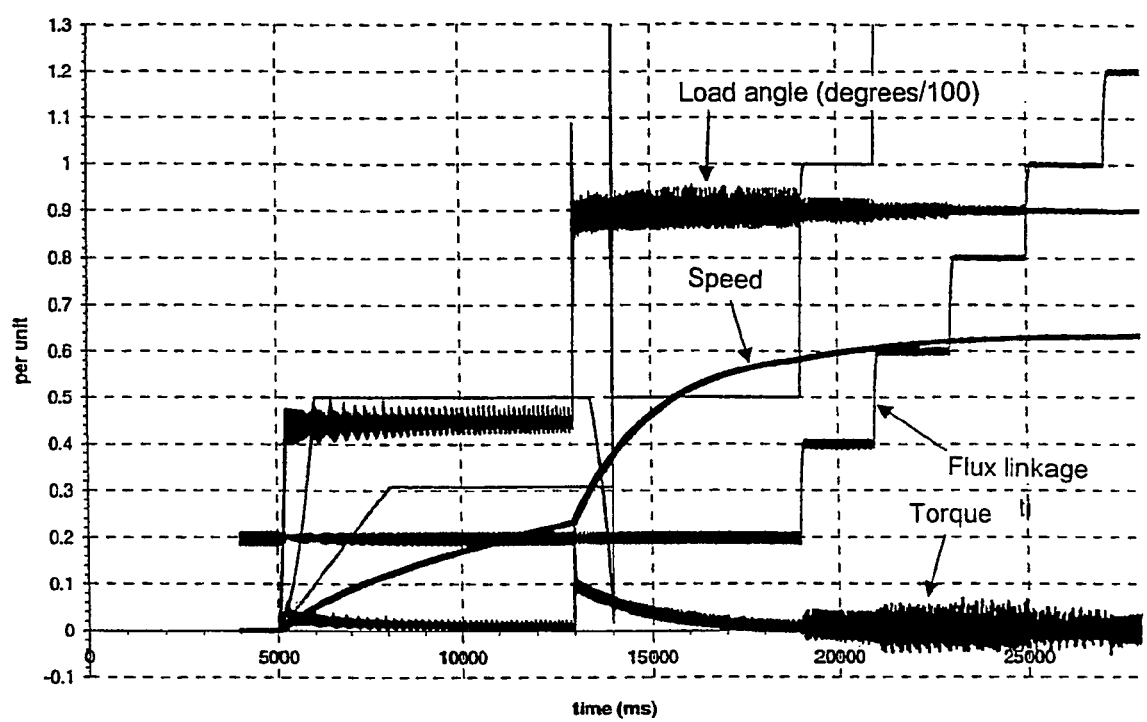
FIG. 3 shows simulated curve forms of a synchronous machine in connection with the method of the invention.

FIG. 3 shows simulation results of an identification run, which are briefly described in the following to clarify the method of the invention. Identification was started by switching electricity on in the motor at time instant zero. After this, the currents of the machine were allowed to settle for five seconds. The stator flux linkage reference was set to 0.2 per unit (pu), i.e. a value that corresponds to 20% of the nominal value. At five seconds, the speed reference was increased so that the motor started rotating. The load angle limit of 45 degrees was kept until 13 seconds, after which the limit was increased to 90 degrees. The increase in the limit resulted at first in an increase in the torque, but due to the shorted out rotor, the currents in the rotor quickly dampened. So as to maintain the load angle limit in the machine, the speed reference was increased at 14 seconds. At 17 seconds, the measurement was started, which is shown by the stepwise increase of the flux linkage from 19 seconds onwards. FIG. 3 also shows curve forms of other quantities, but the above describes the most important quantities for understanding the invention.

It is obvious to a person skilled in the art that while the technology advances, the basic idea of the invention can be implemented in many different ways. The invention and its embodiments are thus not restricted to the examples described above, but can vary within the scope of the claims.

What is claimed is:

1. A method for defining quadrature-axis magnetizing inductance of a synchronous machine when the synchronous machine is fed with an inverter, wherein the method comprises the steps of starting the synchronous machine without load or with reduced load, keeping the rotor current of the synchronous machine substantially at zero, accelerating the synchronous machine to initial angular velocity of measurement, controlling the load angle ($\delta_s$) of the synchronous machine substantially to 90 degrees, defining the stator voltage ($\overline{u}_s$) the stator current ($\overline{i}_s$) and the electrical angular velocity ($\omega$) of the synchronous machine, and defining the quadrature-axis magnetizing inductance ($L_{mq}$) of the synchronous machine on the basis of the stator voltage ($\overline{u}_s$), the stator current ($\overline{i}_s$) and the electrical angular velocity ($\omega$) of the machine.

2. A method as claimed in claim 1, wherein the start-up of the synchronous machine comprises a step of starting the synchronous machine at reduced flux.

3. A method as claimed in claim 1, wherein the method also comprises a step of changing the flux of the synchronous machine and performing the definition of the stator voltage ($\overline{u}_s$), stator current ($\overline{i}_s$), and electrical angular velocity ($\omega$) of the machine, and the definition of quadrature-axis magnetizing inductance ($L_{mq}$) based thereon repeatedly as the flux changes.

4. A method as claimed in claim 3, wherein the flux of the synchronous machine is changed step by step, and the measurements are made after each stepwise change.

5. A method as claimed in claim 3, wherein the method also comprises a step of accelerating the speed of the machine.

6. A method as claimed in claim 1, wherein the start-up of the machine comprises a step of starting the machine at a limited load angle.

7. A method as claimed in claim 1, wherein keeping the rotor current of the machine substantially at zero comprises a step of shorting out the rotor coils, opening them or equipping them with a resistor, or of feeding the rotor coils from a current supply.

8. A method as claimed in claim 1, wherein the quadrature-axis magnetizing inductance ($L_{mq}$) of the synchronous machine is calculated by formula $$L_{mq} = -\frac{u_{sd}}{\omega i_{sq}} - L_{s\sigma},$$

wherein $u_{sd}$ is the direct-axis component of the stator voltage, $\omega$ is the electrical angular velocity of the motor, $i_{sq}$ is the quadrature-axis component of the stator current and $L_{s\sigma}$ is the known leakage inductance of the stator.

9. A method as claimed in claim 1, wherein the definition of the quadrature-axis magnetizing inductance of the synchronous machine comprises the steps of calculating by means of the quadrature-axis magnetizing inductance ($L_{mq}$), known leakage inductance ($L_{s\sigma}$) of the stator, electrical angular velocity ($\omega$) of the motor and the defined direct-axis component ($i_{sq}$) of the stator current an estimate ($u_{sd,est}$) for the direct-axis component of the stator voltage by using the formula the $$u_{sd,est} = -\omega i_{sq}(L_{mq} + L_{s\sigma}),$$

comparing the estimate ($u_{sd,est}$) of the stator voltage direct-axis component with the defined stator voltage ($u_{sd}$), and correcting the magnitude of the quadrature-axis magnetizing inductance ($L_{mq}$) on the basis of the comparison.

* * * * *